United States Patent
Gao et al.

(10) Patent No.: US 10,015,269 B2
(45) Date of Patent: Jul. 3, 2018

(54) METHOD AND DEVICE FOR PROVIDING CONTACT INFORMATION

(71) Applicant: Xiaomi Inc., Beijing (CN)

(72) Inventors: Yi Gao, Beijing (CN); Hongqiang Wang, Beijing (CN); Hai Long, Beijing (CN)

(73) Assignee: XIAOMI INC., Beijing (CN)

( * ) Notice: Subject to any disclaimer, the term of this patent is extended or adjusted under 35 U.S.C. 154(b) by 297 days.

(21) Appl. No.: 14/751,985

(22) Filed: Jun. 26, 2015

(65) Prior Publication Data

US 2016/0162579 A1 Jun. 9, 2016

Related U.S. Application Data

(63) Continuation of application No. PCT/CN2015/078101, filed on Apr. 30, 2015.

(30) Foreign Application Priority Data

Dec. 9, 2014 (CN) .......................... 2014 1 0751247

(51) Int. Cl.
   *G06F 15/16* (2006.01)
   *H04L 29/08* (2006.01)
   *G06Q 10/10* (2012.01)

(52) U.S. Cl.
   CPC ............. *H04L 67/22* (2013.01); *G06Q 10/10* (2013.01)

(58) Field of Classification Search
   CPC ...... H04L 67/22; H04L 61/1594; G06Q 10/10
   See application file for complete search history.

(56) References Cited

U.S. PATENT DOCUMENTS

| 2004/0215608 | A1 | 10/2004 | Gourlay |
| 2010/0312713 | A1 | 12/2010 | Keltner et al. |
| 2014/0101243 | A1* | 4/2014 | Naveh .................... H04L 67/22 709/204 |
| 2015/0248488 | A1* | 9/2015 | Ismail ............... G06F 17/30864 707/722 |

FOREIGN PATENT DOCUMENTS

| CN | 101105795 A | 1/2008 |
| CN | 101136869 A | 3/2008 |
| CN | 102172007 A | 8/2011 |

(Continued)

OTHER PUBLICATIONS

Patent Cooperation Treaty, International Search Report and Written Opinion issued in corresponding International Application No. PCT/CN2015/078101 with English translation, dated Jul. 7, 2015, 24 pages.

(Continued)

*Primary Examiner* — Nam T Tran
(74) *Attorney, Agent, or Firm* — Arch & Lake LLP (57) ABSTRACT

The present disclosure relates to a method and a device for providing contact information, which improves a communication efficiency of a user on the internet. The method is applied in a server, and the method includes: obtaining keyword information input by a first user; determining contact information of at least one second user inputting same or similar keyword information as input by the first user; displaying the contact information of the at least one second user to the first user.

7 Claims, 9 Drawing Sheets

(56) References Cited

FOREIGN PATENT DOCUMENTS

| | | |
|---|---|---|
| CN | 102947855 A | 2/2013 |
| CN | 103646092 A | 3/2014 |
| CN | 104462377 A | 3/2015 |
| JP | 2010211473 A | 9/2010 |
| JP | 2011237912 A | 11/2011 |
| JP | 2014038442 A | 2/2014 |
| KR | 20140070922 A | 6/2014 |
| WO | WO 2013/184298 A1 | 12/2013 |

OTHER PUBLICATIONS

European Patent Office, Extended European Search Report issued in corresponding EP Application No. 15194613.4, dated Jan. 29, 2016, 5 pages.
Japanese Patent Office, Office Action for JP Application No. 2016-521595 with English translation, dated Apr. 28, 2017, 6 pages.
Korean Intellectual Property Office, Notification of Reason for Refusal for Korean Application No. 10-2015-7020391 with English translation, dated May 12, 2016, 16 pages.
Korean Intellectual Property Office, Notice of Final Rejection for Korean Application No. 10-2015-7020391 with English translation, dated Nov. 24, 2016, 9 pages.
Mexican Patent Office, Office Action for Mexican Application No. 2015009218 with English translation, dated Apr. 7, 2017, 6 pages.
Japanese Patent Office, Office Action for JP Appl. No. 2016-521595 with English translation, dated Jan. 31, 2018, 4 pages.

\* cited by examiner

METHOD AND DEVICE FOR PROVIDING CONTACT INFORMATION

CROSS-REFERENCE TO RELATED APPLICATION

The present application is a continuation application of International Application No. PCT/CN2015/078101, filed with the State Intellectual Property Office of P. R. China on Apr. 30, 2015, which is based upon and claims priority to Chinese Patent Application No. 201410751247.7, filed on Dec. 9, 2014, the entirety contents of which are incorporated herein by reference.

TECHNICAL FIELD

The present disclosure relates to communication network technology, and more particularly, to providing contact information related to communication network technology.

BACKGROUND

When a user searches for related content with a keyword using a search engine, the search engine may recommend related uniform resource locator link (URLs), pages and the like to the user. For example, if the user intends to take a national civil service examination and has a question about the national civil service examination, then the user may search for information with keywords "nation, civil servant, examination," or the like using the search engine, and the search engine may respond with a number of link URLs or pages to the user.

SUMMARY

According to a first aspect, a method for providing contact information that may be implemented in a server includes receiving keyword information input by a first user. The method also includes determining contact information of a second user that has input keyword information that is associated with the keyword information input by the first user. The method also includes displaying the contact information of the second user to the first user.

Another aspect includes a device for providing contact information, the device includes a processor and a memory configured to store instructions executable by the processor. The processor may receive a first keyword information input by a first user. The processor may determine contact information of a second user that input a second keyword information associated with the first keyword information. The processor may display the contact information of the second user to the first user.

Yet another aspect includes a non-transitory computer-readable storage medium having stored therein instructions that, when executed by a processor, causes the processor to perform a method for providing contact information. The non-transitory computer-readable storage medium includes instructions to obtain a first keyword information input by a first user. The non-transitory computer-readable storage medium also includes instructions to determine contact information of a second user input a second keyword information that is related to the first keyword information. The non-transitory computer-readable storage medium also includes instructions to display the contact information of the second user to the first user. input It is to be understood that both the foregoing general description and the following detailed description are exemplary and explanatory only and are not restrictive.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
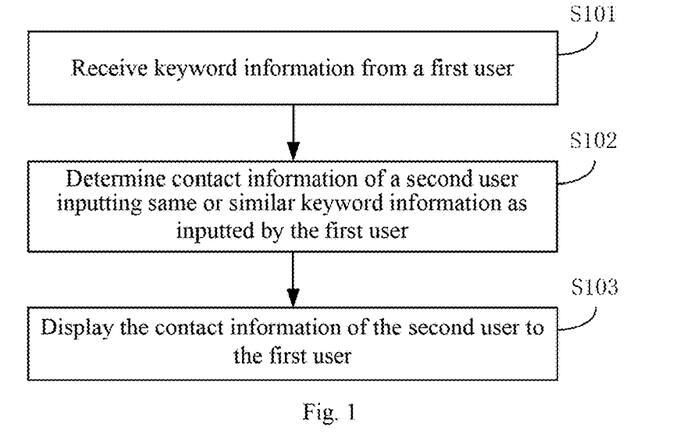
FIG. 1 is a flow chart illustrating an example method for providing contact information.

FIG. 1 is a flow chart illustrating an example method for providing contact information. The method for providing contact information may be implemented in a server computer, or a server farm. As shown in FIG. 1, the method for providing contact information may include at least the following steps S101-S103.

In step S101, the server may receive keyword information input by a first user.

The first user may input the keyword information via a search engine, or may input the keyword information via an internet portal site or a portal system of an enterprise application system, or the like. The keyword information may include at least one keyword. For example, the user may input one keyword "civil servant", or two keywords "civil servant, administrative ability examination," or any other number of keywords for search.

In step S102, the server may identify contact information of one or more second users that input same or similar keyword information as input by the first user.

For example, consider that the keyword information input by the first user is "civil servant, administrative ability examination." The one or more second users may include a user performing a search using the same or similar keywords (such as, civil servant, administrative ability examination, civil service examination, state examination) as the keywords "civil servant, administrative ability examination,"

being used by the first user. The first user may further communicate with a recommended contact regarding related matters involved with the keyword information, according to the contact information identified.

In step S103, the server may display the contact information of the one or more second users to the first user.

For example, the contact information may be displayed to the first user via the page of the search engine. Alternatively or in addition, the contact information may be displayed to the first user via the internet portal site or the portal system of the enterprise application system. By displaying the contact information, the first user may select a way of communicating with one of the second users using the contact information. For example, the contact information may be "a nickname of a user+ a QQ number, a phone number." In this way, the first user may contact efficiently find one or more second users to consult with, thus performing an effective communication.

Accordingly, the contact information provided to the first user based on the keyword input by the first user, may facilitate the first user to find and consult with one or more second users with the same or similar search. Alternatively or in addition, the first user may add the one or more second users as a contact or a friend in a third-party instant messaging system. Thus the communication efficiency may be improved and the first user and the second users may consult with each other about the keyword information.

In an example, step S102 may include searching a contact list for a search conducted by another user using keyword information that is associated with the keyword information used by the first user. For example, the search by the another user may be identified based on same or similar keyword information as input by the first user. The contact list may be stored at a location accessible by the server, such as on a memory storage of the server itself. The server may store the contact list by including contact information recorded in the server with corresponding keyword information input by the respective users corresponding to the contact information. The server may, as a result of searching the contact list, obtain a first contact information corresponding to the same or similar keyword information as input by the first user. The first contact information may contain contact information of more than one users. The server may further determine an activity of each of the users corresponding to the first contact information. The activity is a score indicative of a relation between a user in the contact list and the keywords being searched by the first user. For example, the activity of a user A may quantitatively represent user A's knowledge about the keywords being searched for by the first user. For example, the activity may be based on number of messages posted or replied to by the user A. Based on the activity of the users, the server may identify the users that may be included in the one or more second users to be displayed to the first user.

For example, the method for providing contact information may further include determining a first number of messages posted by each of the users corresponding to the first contact information. The messages may be posted on a website associated with the server, or any other website such as a forum, instant messaging portal, social media website, or any other website. Alternatively or in addition, the server may determine a second number of reply messages posted by each of the users corresponding to the first contact information. The reply messages may be posted on the site associated with the server or any other website as indicated above. The server may associate a weighting factor to the first number of the messages and the second number of messages. For example, the first number of messages may be weighted by a first weight coefficient and the second number of messages may be weighted by a second weight coefficient respectively. The server may use the weighted coefficients to associate a weighted value to each of the users corresponding to the first contact information. The server may update the activity of each of the users corresponding to the first contact information according to the weighted value of each of the users corresponding to the first contact information.

For example, the method for providing contact information may further include associating a scoring information to each of the users corresponding to the first contact information. The server may update the activity of each of the users corresponding to the first contact information according to a third weight coefficient corresponding to the scoring information of each of the users corresponding to the first contact information.

For example, the method for providing contact information may further include receiving contact details of the first user and an authorization corresponding to the contact details from the first user. The server may, for example, update the contact list according to a name of the first user, the keyword information input by the first user, and the contact details of the first user. The server may determine whether to publish the name of the first user, the keyword information input by the first user, and the contact details of the first user based on the authorization from the first user.

For example, the first user, in response to finding the one or more second users with same or similar search may add a User-B from the second users as a contact or a friend. For example, the first user may add the User-B as a contact in an instant messaging tool, a social media platform, or the like, such that the first user may communicate with the User-B, to improve communication efficiency so that the first user and User-B may consult about the keyword information.

Figure 2:
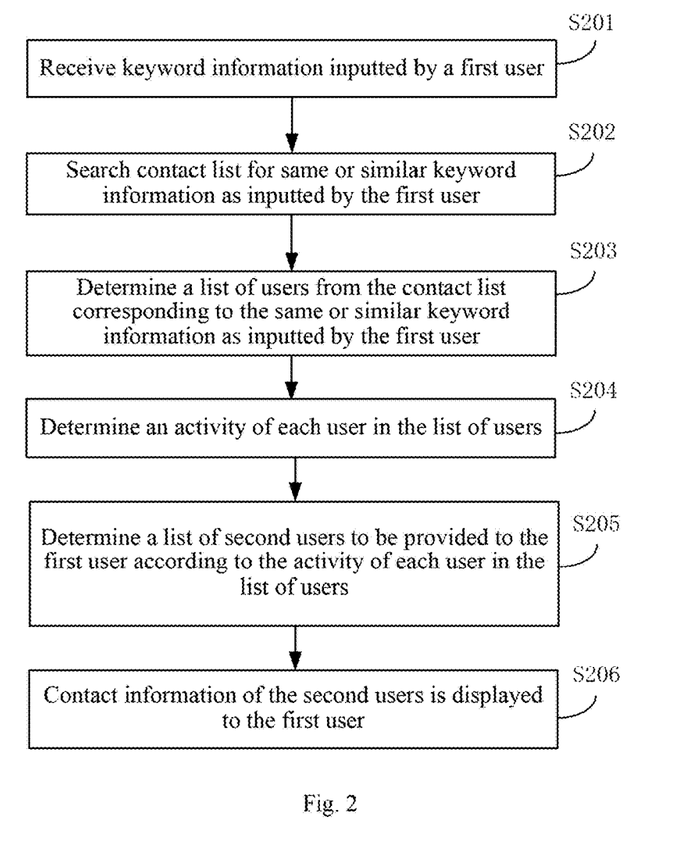
FIG. 2 is a flow chart illustrating an example method for providing contact information.

FIG. 2 is a flow chart illustrating an example method for providing contact information. As shown in FIG. 2, the method may include at least the following steps.

In step S201, the server may receive keyword information input by a first user.

In step S202, the server may search through a contact list for users that may have requested a similar search based on the same or similar keyword information as input by the first user. The contact list may be stored on a memory device of the server or any other location accessible by the server. The contact list may contain contact information of users along with keyword information input by the users. The server may store the contact list.

The contact list may store information of a number of users. Table 1 is an example contact list. While Table 1 shows only five users, in other examples, the contact list may contain several hundred, thousand, million, or even more users.

TABLE 1

| Username | Keyword | Contact details | activity |
|---|---|---|---|
| A | civil servant | wechat number: 123456<br>phone number: 1821231233 | 103 |
| B | administrative ability examination | QQ number: 1098765 | 603 |
| C | civil servant, administrative ability examination | wechat number: 231452 | 204 |
| D | government office | phone number: 136813423443 | 14 |

TABLE 1-continued

| Username | Keyword | Contact details | activity |
|---|---|---|---|
| E | postgraduate, examination | phone number: 1591023XXXX | 57 |

The contact list contains one or more keyword-user associations. A keyword-user association is a pairing of a user and keyword information that the user may enter in the search engine. As shown in Table 1, user A is associated with the keyword "civil servant." A user may have more than entry in the contact list, for example, if user A conducts another search with the keyword information "transformer movie," the contact list may contain another keyword-user association for user A and "transformer movie."

In an example, the contact list may include keyword information that a user has entered within a predetermined time-frame. For example, the contact list may be limited to keywords entered within past day, past week, past month, or any other predetermined time-frame. Alternatively or in addition, the contact list may be limited to contain keywords for a predetermined number of searches that a user may have performed. For example, the keywords for the past five searches, or past ten searches, or past 100 searches, or any other predetermined number of searches performed by the user may be stored in the contact list.

In addition, each keyword-user association in the contact list may contain contact details, and activity associated with the keyword-user association, among other information. For example, Table 1 illustrates a contact list containing, keywords, contact details and corresponding activities of five users A, B, C, D and E. For example, if the first user inputs keyword information "civil servant", a plurality of keywords (for example, "civil servant" (same), "administrative ability examination" (similar), "civil servant, administrative ability examination" (same+similar), "government office" (similar)) may be determined from the contact list according to the keyword information "civil servant". It should be understood by those skilled in the art that, Table 1 is just an exemplary example, but is not intended to limit the examples of the present disclosure.

In step S203, the server determines a list of users from the contact list corresponding to the same or similar keyword information as input by the first user.

For example, as shown in Table 1, the list of users identified would include A, B, C and D.

In step S204, an activity of each of the users in the list of users may be determined.

For example, an activity of the first user may be determined according to a number of messages posted by the first user on a website. The website may be a website associated with the server. For example, the number of messages posted may include a first number of messages posted by the first user on the website. The number of messages posted may also include a second number of messages replied to by the first user on the website. For example, if the first user is familiar with the "administrative ability examination" in the "civil service examination," the first user may post a message about the "administrative ability examination" on a forum, or may actively reply questions about the "administrative ability examination" from others. Thus, the first number and the second number may be used as a reference for the activity of the first user.

In step S205, the contact information of the one or more second users to be provided to the first user is determined from the list of users according to the activity of each of the users in the list of users.

In an example, the activities of the users may be ranked, and users with the top three activities may be shortlisted as contacts to be provided to the first user. For example, from Table 1, the users with the top three activities are B, C and A, and thus the QQ number 1098765 of user B, the wechat number 231452 of user C, the wechat number 123456 of user A and the phone number 1821231233 of user A may be provided to the first user.

In step S206, the contact information corresponding to the one or more second users thus shortlisted may be provided and displayed to the first user.

Thus, the first user receives the contact information of the one or more second users according to the activities related to the same or similar searching requirements as the first user's searching requirement. The first user may add the a User-B from the one or more second users as a contact or a friend in the wechat, and then they can communicate with User-B, thus enhancing the communication efficiency and facilitating the first user to find information about the keyword information.

Figure 3:
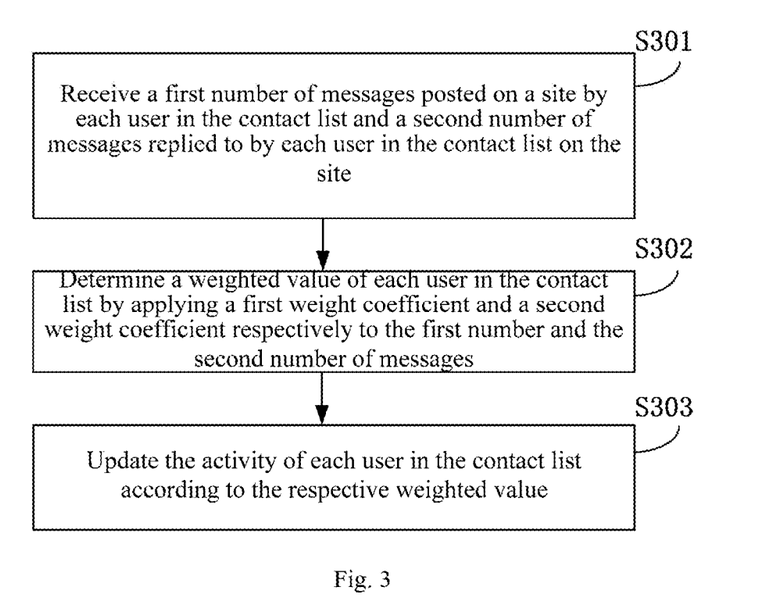
FIG. 3 is a flow chart illustrating an example method for providing contact information.

FIG. 3 is a flow chart illustrating an example method for providing contact information. As shown in FIG. 3, the method for providing contact information may include at least the following steps.

In step S301, the server may determine a first number of messages posted by each user in the contact list. The messages may be posted on a website associated with the server. The server may determine a second number of messages replied to by each user in the contact list. The users may reply to messages on the website associated with the server.

For example, the website may be a search engine provided by the server, or may be a website provided by other search engine providers providing open interfaces to the server. For example, a user AndyGao posts a message about "civil servant" on a search engine A and a search engine B. If a search engine provider A and a search engine provider B open their server interfaces to each other, then a server corresponding to the search engine A may obtain the message posted by the user AndyGao in a server corresponding to the search engine B. At this time, the search engine B is a website associated with the server corresponding to the search engine A.

In step S302, the first number and the second number are weighted by a first weight coefficient and a second weight coefficient respectively to obtain a weighted value of each user in the contact list.

For example, consider that a user E in the contact list posts 100 messages about "civil servant" on a search engine "www.dddd.com" and replies to 150 messages about "civil servant" posted by others. By weighting the first number and the second number by a first weight coefficient (such as 0.2) corresponding to the first number and a second weight coefficient (such as 0.1) corresponding to the second number respectively, an activity of the user E about "civil servant" may be obtained. For example, 100*0.2+150*0.1=35, and then 35 may be added to the original activity of the user E.

In step S303, the activity of each contact in the contact list may be updated according to the weighted value of each user in the contact list.

Thus, based on the first number of messages posted by and the second number of messages replied to by each user in the contact list the activity of each user in the contact list may be updated. The activities in the contact list may then be used to identify contact information of those users that are involved in activities related to the keyword input by the first user.

Figure 4:
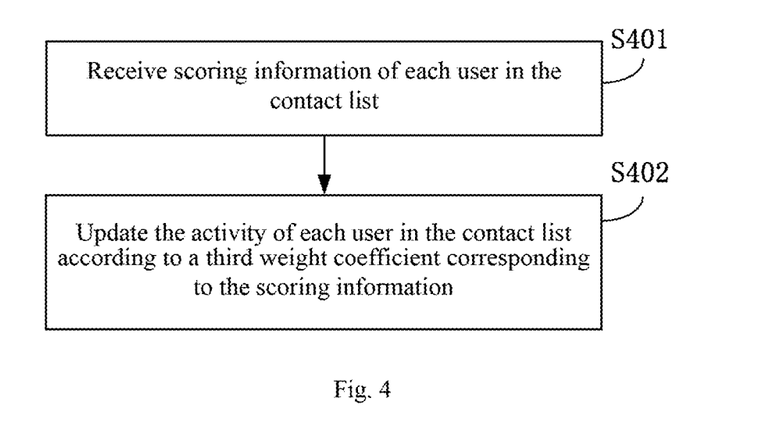
FIG. 4 is a flow chart illustrating an example method for providing contact information.

FIG. 4 is a flow chart illustrating an example method for providing contact information. As shown in FIG. 4, the method for providing contact information includes at least the following steps.

In step S401, the server may receive a scoring information of each user in the contact list. The scoring information may be received from the website associated with the server.

For example, consider that a user F in the contact list may post a series of messages about "civil servant" on a search engine "www.dddd.com", other users (F1, F2, F3 and so on) score the messages posted by the user F. For example, F1, F2 and F3 score the messages posted by the user F based on whether the messages were helpful for themselves. Assume that the scores from F1, F2 and F3 are 4.5, 5.0 and 4.3 respectively. And then the score of the user F may be calculated, which is 4.5+5.0+4.3=13.8. The score for user F may be calculated in any other manner in other examples.

In step S402, the activity of each user in the contact list may be updated according to a third weight coefficient corresponding to the scoring information of each user in the contact list.

For example, F1, F2 and F3 score the messages about "civil servant" posted by the user F and the resulting score is 13.8. The score 13.8 may be weighted by the third weight coefficient (such as 0.5), i.e. 13.8*0.5=6.9, and then 6.9 may be added to the existing activity of the user F.

Thus, the server may update the activity of each of the users in the contact list based on the score information of each of the users in the contact list from the website associated with the server. The activities in the contact list may be used to identify the contact information of the users that are involved in activities related to the keyword input by the user.

It should be understood by those skilled in the art that, in order to facilitate the activity of a user to reflect the relativity between the user and a keyword, the example method illustrated in FIG. 3 and the example method illustrated in FIG. 4 may be combined. Thus, by realizing a combination of calculating the first number and the second number of messages posted by the user on the website associated with the server and further obtaining scoring information of the user from the website, the accuracy of the activity of the user related to the keyword may be improved. In turn, the accuracy of the contact information of the one or more second users provided to the user is improved.

Figure 5:
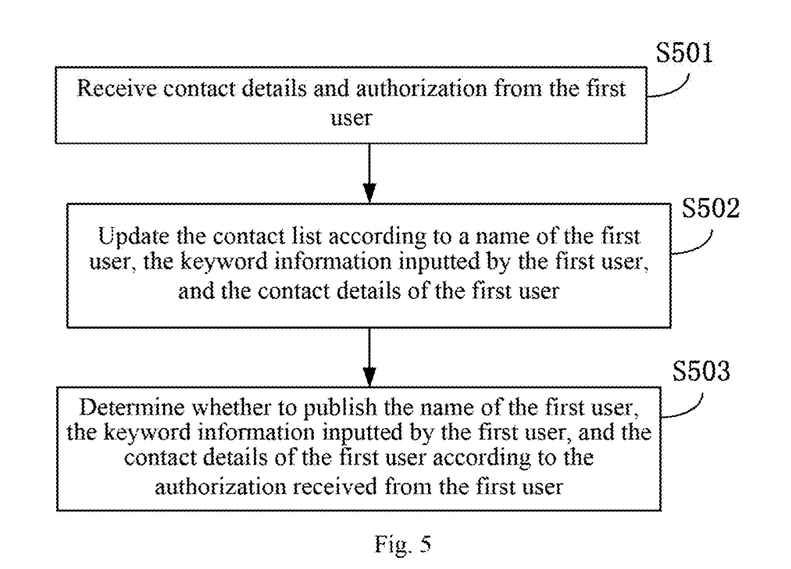
FIG. 5 is a flow chart illustrating an example method for providing contact information.

FIG. 5 is a flow chart illustrating an example method for providing contact information. The method for providing contact information may include at least following steps in addition to those described in other examples described throughout the present document.

In step S501, the server may obtain contact details and an authorization of the first user.

In step S502, the server may update the contact list according to a name of the first user, the keyword information input by the first user, and the contact details of the first user. See Table 1, for example.

In step S503, the server may determine whether to publish the name of the first user, the keyword information input by the first user, and the contact details of the first user. The determination may be made according to the authorization configuration from the first user.

For example, consider that it is the first time that the first user searches for information with the keyword information on a search engine. The server may acquire and record a username, for example "AndyGao," of the first user, keyword information, such as "civil servant, administrative ability examination," input by the first user "AndyGao," and contact details of the first user, such as "wechat number: 956623364.". The above information is stored in the contact list to update the contact list. Moreover, a column may be set to store authorization configurations in the contact list. For example, if the authorization configuration is "yes," the information of the user is allowed to be published when others search for information with keywords "civil servant or administrative ability examination." If the authorization configuration is "no," the information of the first user is not allowed to be published when others search for information with keywords same or similar to "civil servant or administrative ability examination," thus protecting the personal privacy of the first user. Thus, based on information of a relatively large number of users, such as several thousands, searching using keywords, the contact list is updated. The contact list may then be used to identify contact information of users involved in activities related to the keyword input by the first user. The users corresponding to the identified contact information may communicate with each other regarding the keyword using the contact information. Thus, the communication between the users on the internet is well-directed, and the communication efficiency is improved.

FIGS. 6A-6F illustrate example scenarios in reference to the examples described throughout the present document.

Figure 6A:
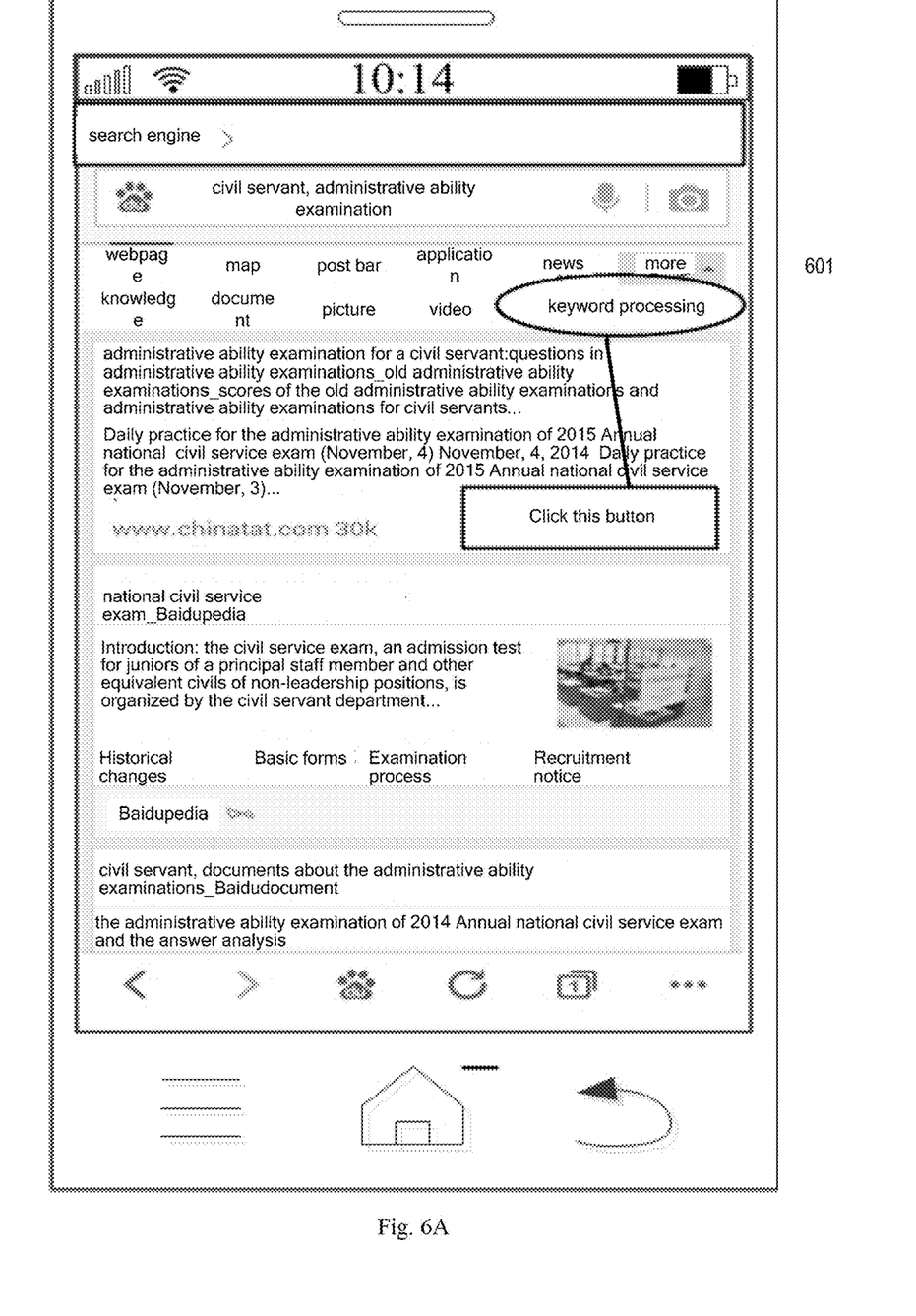
FIG. 6A is a schematic diagram illustrating an example keyword processing page.

As shown in FIG. 6A, a user logs in to a server such as server of a search engine or a server of a portal site that may provide a search function. The user may login via a personal account. The user may search for information with one or more keywords, such as, civil servant, administrative ability examination. If a certain keyword is more important to the user and/or the first user is familiar with the relevant knowledge represented by this keyword, the user may register the personal information by clicking a button, such as the button "keyword processing" 601 that may be displayed on a page with the search results. In response, the server may allow other users to add the user as a contact based on the user's authorization.

Figure 6B:
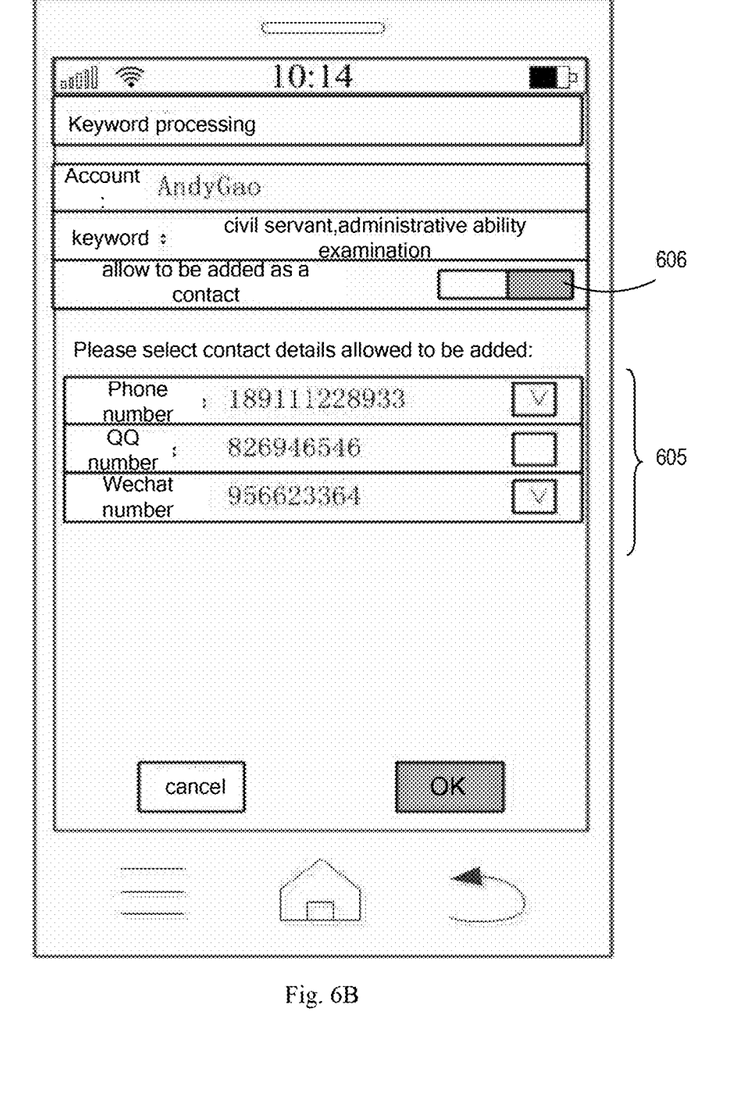
FIG. 6B is a schematic diagram illustrating an authorization configuration of a contact according to an exemplary embodiment of the present disclosure.

For example, FIG. 6B illustrates an example page on which the user provides his/her personal information 605. For example, the user may provide contact information such as "phone number", "wechat number" and contact information on any other platform to the server. The user may configure whether the server may allow the user to be added as a contact with regard to the keyword information. For example, the user may configure the contact details and corresponding authorizations via an option "allow to be added as a contact" 606. For example, if the user AndyGao allows other users to obtain the phone number and the wechat number when the other users search for information with keywords "civil servant, administrative ability examination," then the QQ number is not published. The publication of the contact details may be configured according to the user's confidentiality requirements. For example, the user may only allow the other users to add his/her QQ number sometimes, and allows the other users to add his/her phone number sometimes, and other possible combinations.

Figure 6C:
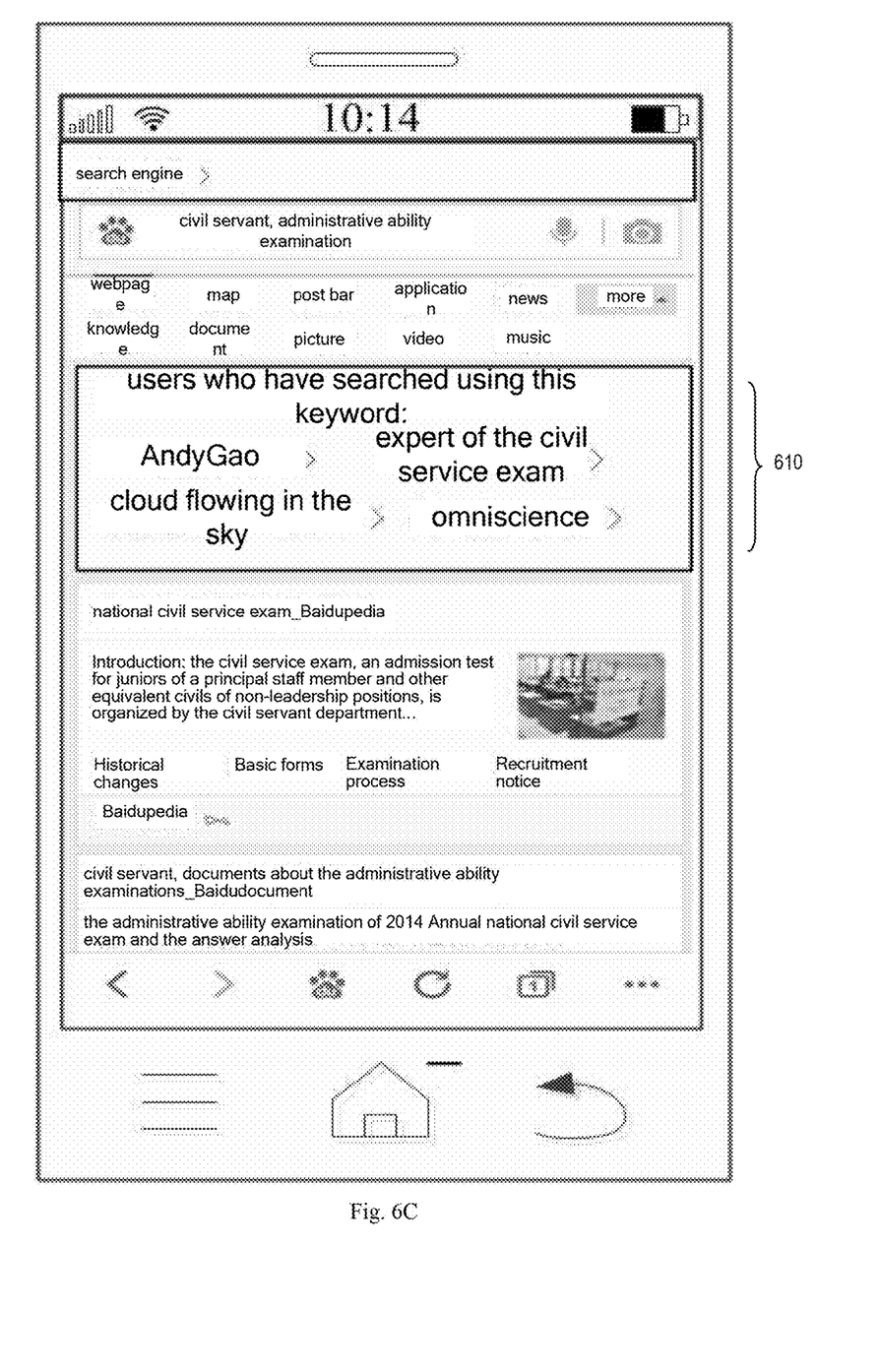
FIG. 6C is a schematic diagram illustrating an example recommendation page.

As shown in FIG. 6C, when a second user searches for information with similar keywords in the search engine, the server may display contact information 610 in a search result page to the second user by performing one of the example methods described throughout the present document. For example, the contact information 610 may include user accounts of four contacts (AndyGao, expert of the civil service exam, cloud flowing in the sky, and omniscience) and the number of contacts that may be added as contacts in the third-party instant message tool.

Figure 6D:
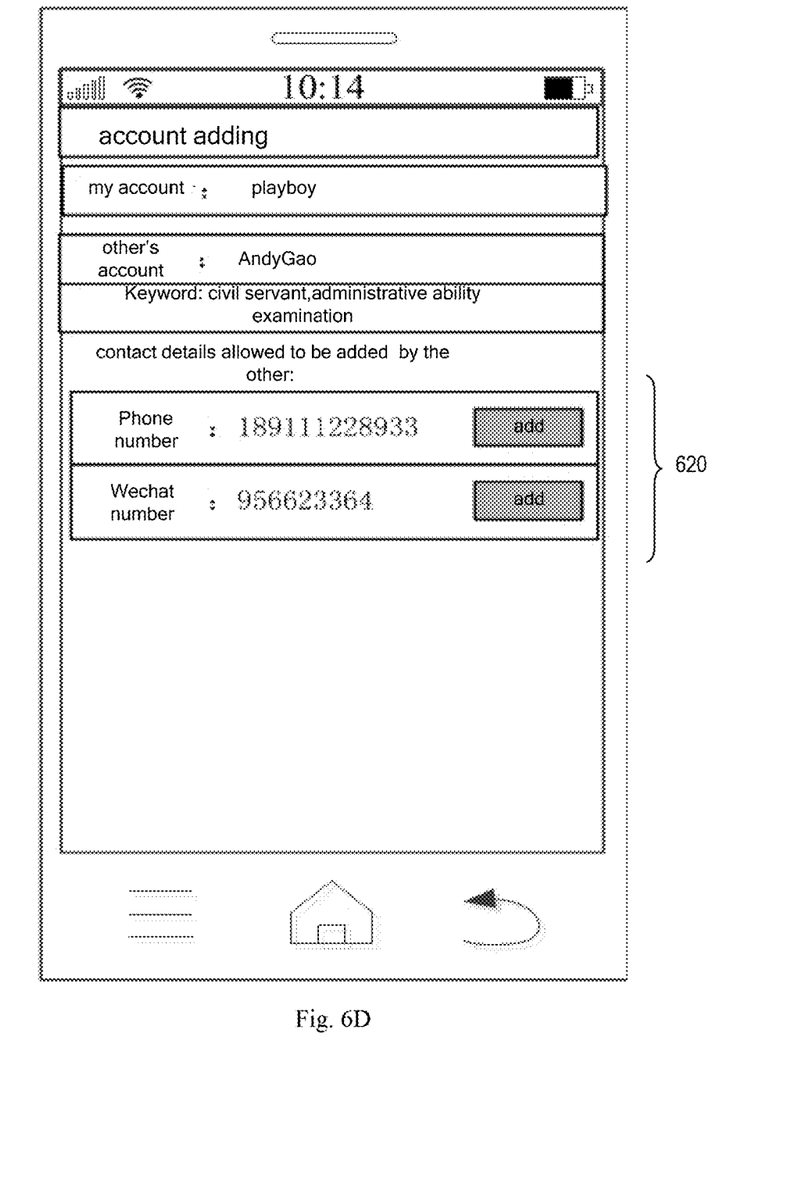
FIG. 6D is a schematic diagram illustrating an example recommended contact.

As shown in FIG. 6D, detailed information of the a contact from the contact information 610 may be viewed by interacting with, such as by clicking the contact information 610. For example, if the user AndyGao is clicked, contact details 620 of AndyGao are displayed, as shown in FIG. 6D, which are: phone number: 189111228933 and wechat number: 956623364.

Figure 6E:
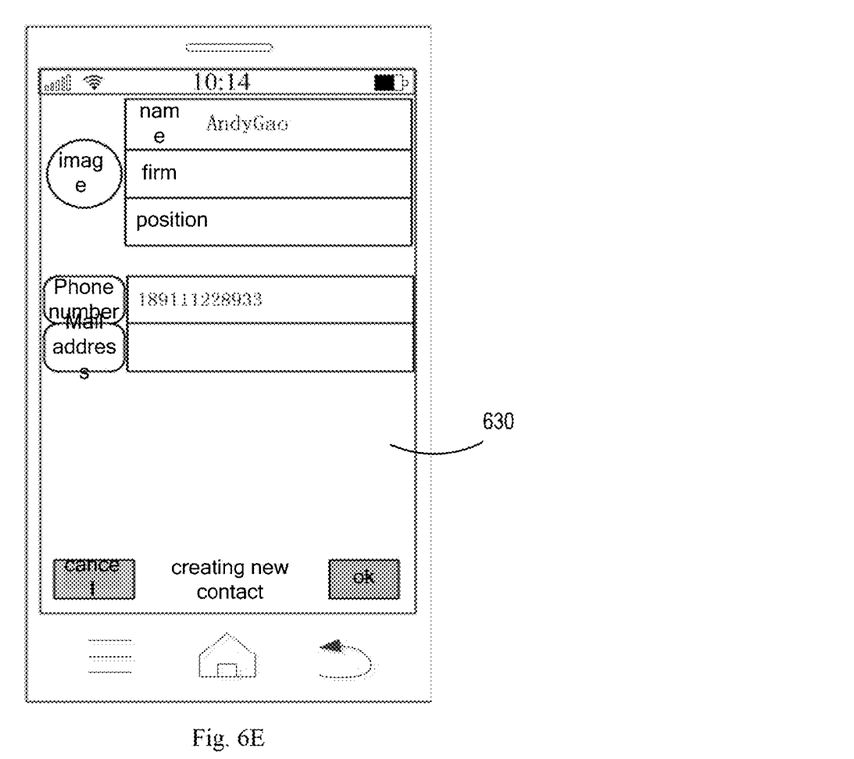
FIG. 6E is a schematic diagram of creating an example contact.

As shown in FIG. 6E, if any of the above contact details 620 is clicked, a contact adding interface 630 of a corresponding application is displayed. The contact adding interface 630 may indicate that the contact is being added based on keywords "civil servant, administrative ability examination." For example, if the published contact detail is a phone number, an address book of the user may be displayed as the contact adding interface 630, and the recommended user name and the published phone number may be added as a contact. Alternatively or in addition, if the published contact detail is an instant messaging service identity, a new contact page of the instant messaging service may be displayed as the contact adding interface 630 with corresponding information about the contact being added.

According to the above descriptions of FIGS. 6A-6E, the user may view, in the search result page, contact information 610 of users who have searched for similar keywords. By interacting with the contact information 610 the user may add one or more of the users as a contact if the user has authorized such an addition. For example, the user may be added as a contact in an address book or in an instant message tool. The contact may be created with reference to the keywords being searched for. Thus, it is efficient for the users to communicate with each other regarding the search results associated with a commonly interested keyword. It may be further beneficial to meet a friend with similar interests or even to solve a problem being commonly faced by consulting with each other.

Figure 7:
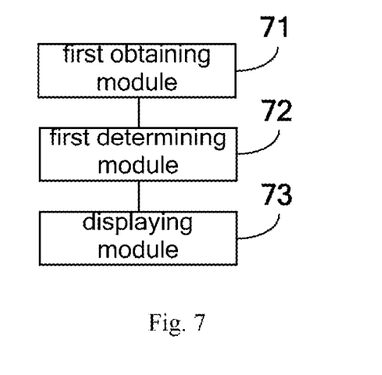
FIG. 7 is block diagram illustrating an example device for providing contact information.

FIG. 7 is a block diagram illustrating an example device for providing contact information. The device for providing contact information may be a server, or part of a server. As shown in FIG. 7, the device for providing contact information may include a first obtaining module 71, a first determining module 72, and a displaying module 73. The first obtaining module 71 may obtain keyword information input by a first user. The first determining module 72 may determine contact information of a second user inputting same or similar keyword information as obtained by the first obtaining module 71. The displaying module 73 may display the contact information determined by the first determining module 72 to the first user.

Figure 8:
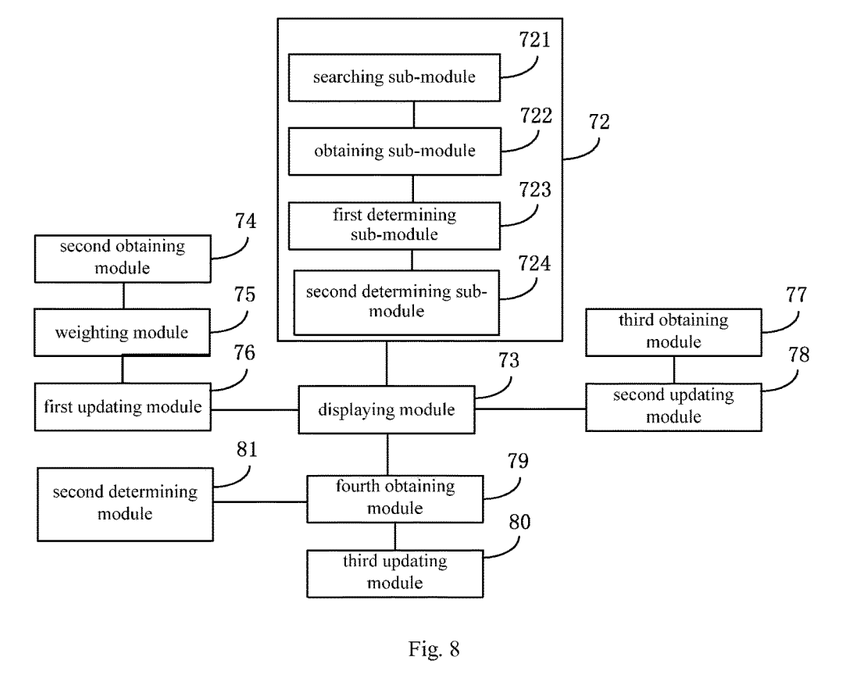
FIG. 8 is block diagram illustrating an example device for providing contact information.

As shown in FIG. 8, the first determining module 72 may include a searching sub-module 721, an obtaining sub-module 722, a first determining sub-module 723, and a second determining sub-module 724.

The searching sub-module 721 may search a contact list for same or similar keyword information as input by the first user. The contact list may be stored in a memory storage of the device itself or any other memory storage accessible by the device. The contact list may contain contact information of users and keyword information input by the respective users.

The obtaining sub-module 722 may obtain a list of users from the contact list. The list of users contains contact information of the users that have performed a search with the same or similar keyword information searched by the searching sub-module 721.

The first determining sub-module 723 may determine an activity of each of users in the list of users obtained by the obtaining sub-module 722. The activity is a score indicative of a relation between a user in the contact list and the keywords being searched by the first user. The second determining sub-module 724 may shortlist, from the list of users, the second user to provide to the first user. The second determining sub-module 724 may select the second user based on the activities of each of the users from the list of users, as determined by the first determining sub-module 723.

The device for providing contact information may further include a second obtaining module 74, a weighting module 75, and a first updating module 76. The second obtaining module 74 may obtain a first number of messages posted by each user in the contact list on a site associated with the server. The second obtaining module 74 may additionally or alternatively obtain a second number of messages replied to by each user in the contact list on the website. The website may be a forum, a social media platform, or any other website.

The weighting module 75 may associate a weighted value to each user in the contact list. For example, the weighting module 75 may apply a first weight coefficient and a second weight coefficient respectively to the first number and the second number of messages obtained by the second obtaining module 74.

The first updating module 76 may update the activity of each user in the contact list according to the weighted value of each user obtained by the weighting module 75.

In an example, the device for providing contact information may further include a third obtaining module 77, and a second updating module 78. The third obtaining module 77 may obtain scoring information of each user in the contact list from the website associated with the server, on which the users may have posted messages or replies to messages. The second updating module 78 may update the activity of each user in the contact list according to a third weight coefficient corresponding to the scoring information of each user in the contact list obtained by the third obtaining module 77.

In an example, the device for providing contact information may include a fourth obtaining module 79, a third updating module 80, and a second determining module 81. The fourth obtaining module 79 may obtain contact details and an authorization configuration of the first user. The third updating module 80 may update the contact list according to a name of the first user, the keyword information input by the first user and the contact details of the first user. The second determining module 81 may determine whether to publish the name of the first user, the keyword information input by the first user and the contact details of the first user based on the authorization configuration of the first user obtained by the fourth obtaining module 79.

Figure 9:
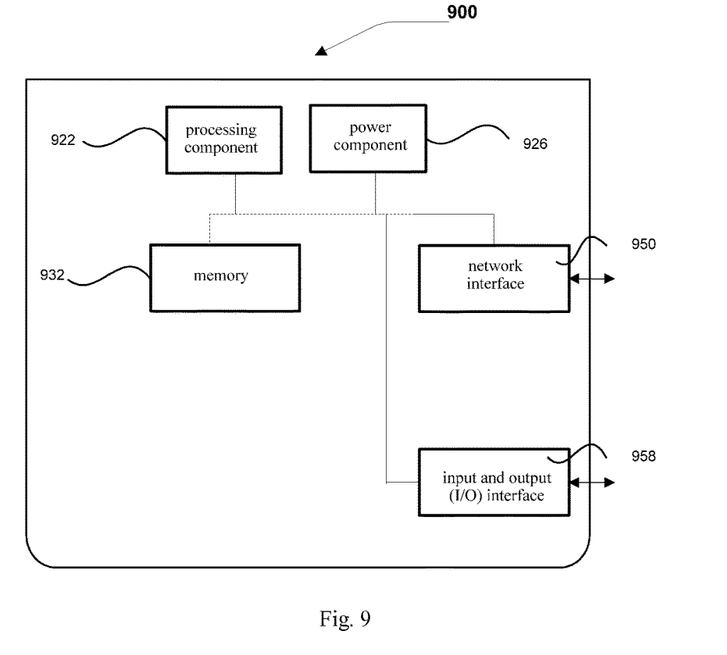
FIG. 9 is block diagram illustrating an example device for providing contact information.

FIG. 9 is a block diagram illustrating a device suitable for providing contact information. For example, the device 900 may be a server. Referring to FIG. 9, the device 900 may include a processing component 922 including one or more processors, and a memory 932 for storing instructions (such as application programs) executable by the processing component 922. For example, the memory 932 may be non-transitory computer-readable storage medium such as a ROM, a RAM, a CD-ROM, a magnetic tape, a floppy disc, an optical data storage device, and the like. The application programs stored in the memory 932 may include one or more modules, and each module may correspond to a series of instructions. Furthermore, the processing component 922 may be configured to execute the instructions so as to perform the example methods for providing contact information as described throughout the present document.

The device 900 may further include a power component 926 that may perform a power management of the device 900, a wired or wireless network interface 950 configured to connect the device 900 to the internet, and an input and output (I/O) interface 958. The device 900 may operate an operating system stored in the memory 932, such as Windows Server™, Mac OS X™, Unix™, Linux™, FreeBSD™ and so on.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various examples have been described, it will be apparent to those of ordinary skill in the art that many more examples and implementations are possible. Accordingly, the examples described herein are not the only possible examples and implementations.

What is claimed is:

1. A method for providing contact information, wherein the method is applied in a server, and the method comprises:
   receiving keyword information input by a first user;
   determining contact information of a second user that has input keyword information that is associated with the keyword information input by the first user; and
   displaying the contact information of the second user to the first user;
   wherein determining contact information of the second user comprises:
   determining a first list of users by searching a contact list for same or similar keyword information as input by the first user from, wherein the contact list is configured to store contact information of a plurality of users and keyword information respectively input by the plurality of users;
   determining an activity of each of user in the first list of users, wherein the activity is a score indicative of a relation between a user in the contact list and keywords being searched by the first user; and
   determining the contact information corresponding to the second user based on the activity of each of the users in the first list of users;
   wherein determining the activity of a user in the first list of users comprises:
   obtaining a first number of messages posted by the user on a website associated with the server and obtaining a second number of messages replied to by the user on the website;
   determining a weighted value for the user by weighting the first number and the second number by a first weight coefficient and a second weight coefficient respectively; and
   updating the activity of the user according to the weighted value.

2. The method according to claim 1, wherein determining the activity of a user in the first list of users comprises:
   obtaining a scoring information associated with the user from a website associated with the server; and
   updating the activity of the user by weighting the scoring information by a third weight coefficient.

3. The method according to claim 1, further comprising:
   receiving contact details and an authorization configuration of the first user;
   updating the contact list according to a name of the first user, the keyword information input by the first user, and the contact details of the first user; and
   publishing the name of the first user, the keyword information input by the first user, and the contact details of the first user in response to the authorization configuration of the first user authorizing publication.

4. A device for providing contact information, the device comprising:
   a processor;
   a memory configured to store instructions executable by the processor;
   wherein the processor is configured to:
     receive a first keyword information input by a first user;
     determine contact information of a second user that input a second keyword information associated with the first keyword information; and
     display the contact information of the second user to the first user;
   wherein the processor is further configured to:
     search a contact list for the first keyword information input, wherein the contact list is configured to store a plurality of keyword-user associations, wherein each keyword-user association in the contact list associates a keyword information with a corresponding user that input the keyword information;
     determine a first list of keyword-user associations based on the search, the first list of keyword-user associations comprising keyword-user associations corresponding to the first keyword information;
     determine an activity of each of the users in the keyword-user associations in the first list of keyword-user associations, wherein the activity is a score indicative of a relation between a user in the contact list and keywords being searched by the first user; and
     determine the contact information of the second user based on the activity of each of the users in the first list of keyword-user associations;
     when determines the activity of a user in the first list of keyword-user associations when the processor is configured to:
     obtain a first number of messages posted by each user in the first list of keyword-user associations on a website associated with the device and a second number of messages replied to by each user in the first list of keyword-user associations on the website;

assign a weighted value to each user in the first list of keyword-user associations based on a first weight coefficient and a second weight coefficient respectively applied to the first number and the second number of messages; and update the activity of each user in the first list of keyword-user associations according to a corresponding weighted value.

5. The device according to claim 4, wherein the processor is further configured to:

obtain a scoring information of each user in the first list of keyword-user associations from a website associated with the device; and update the activity of each user in the first list of keyword-user associations according to a third weight coefficient corresponding to the scoring information.

6. The device according to claim 4, wherein the processor is further configured to:

receive contact details and an authorization configuration of the first user;

update the contact list according to a name of the first user, the keyword information input by the first user, and the contact details of the first user; and publish the name of the first user, the keyword information input by the first user, and the contact details of the first user in response to presence of an authorization to publish in the authorization configuration of the first user.

7. A non-transitory computer-readable storage medium having stored therein instructions that, when executed by a processor, causes the processor to perform a method for providing contact information, the non-transitory computer-readable storage medium comprising:

instructions to obtain a first keyword information input by a first user;

instructions to determine contact information of a second user input a second keyword information that is related to the first keyword information; and instructions to display the contact information of the second user to the first user;

wherein determining contact information of the second user comprises:

determining a first list of users by searching a contact list for same or similar keyword information as input by the first user from, wherein the contact list is configured to store contact information of a plurality of users and keyword information respectively input by the plurality of users;

determining an activity of each of user in the first list of users, wherein the activity is a score indicative of a relation between a user in the contact list and keywords being searched by the first user; and determining the contact information corresponding to the second user based on the activity of each of the users in the first list of users;

wherein determining the activity of a user in the first list of users comprises:

obtaining a first number of messages posted by the user on a website associated with a server and obtaining a second number of messages replied to by the user on the website;

determining a weighted value for the user by weighting the first number and the second number by a first weight coefficient and a second weight coefficient respectively; and updating the activity of the user according to the weighted value.

* * * * *